United States Patent [19]
Newton et al.

[11] Patent Number: 5,167,803
[45] Date of Patent: Dec. 1, 1992

[54] MECHANICALLY CLEANED BAR SCREEN

[75] Inventors: Kenneth G. Newton, Sugar Land; Mark S. Butler, Spring; John C. Jacob, Jr., New Caney, all of Tex.

[73] Assignee: Envirofab, Incorporated, Spring, Tex.

[21] Appl. No.: 594,937

[22] Filed: Oct. 10, 1990

[51] Int. Cl.⁵ .............................................. B01D 29/64
[52] U.S. Cl. .................................... 210/141; 210/159; 210/162
[58] Field of Search .................... 210/159, 162, 141

[56] References Cited

U.S. PATENT DOCUMENTS

| | | | |
|---|---|---|---|
| 2,033,653 | 3/1936 | Schlapak et al. | 210/159 |
| 3,482,698 | 12/1969 | Ostnas | 210/159 |
| 4,725,366 | 2/1988 | Dacus | 210/159 |
| 4,851,114 | 7/1989 | Minichello | 210/162 |
| 4,917,796 | 4/1990 | Rudzinski | 210/162 |

*Primary Examiner*—Ivars Cintins
*Attorney, Agent, or Firm*—Neal J. Mosely

[57] ABSTRACT

A mechanically cleaned bar screen or bar rack is disclosed for removing debris from water and wastewater treatment facilities which comprises a frame with housings supported thereon and a bar rack and dead plate. The apparatus is supported on the ledge of the sluice of a water or wastewater treatment facility tilted backward at an angle of about 0°–30° with the bar rack submerged in the flowing stream of water. A carriage carries a pivotally mounted rake assembly with a rake engaging the bar rack. The carriage is reciprocated along a guide rail by motor operated lead screws which extend through rollnut assemblies supporting the carriage. At the top of the traverse of the carriage, the rake is swept by a wiper to remove debris to discharge down a chute for pick up. The motorized drive system is totally enclosed. The motor and gear boxes are stationary and do not travel with the rake carriage. Corrosion resistant materials are used to ensure long life. The rake carriage is water tight and can be temporarily submerged without damage to the mechanism. The lead screws and linear guide system are enclosed. A motor operated linear actuator system provides positive control to movement of the rake assembly. A programmable controller (PLC) constantly controls the electromechanical actuator and lead screw drive unit to periodically operate lead screws to move the carriage up and down at selected intervals and operate the linear actuator to control angular movement of the rake assembly.

19 Claims, 4 Drawing Sheets

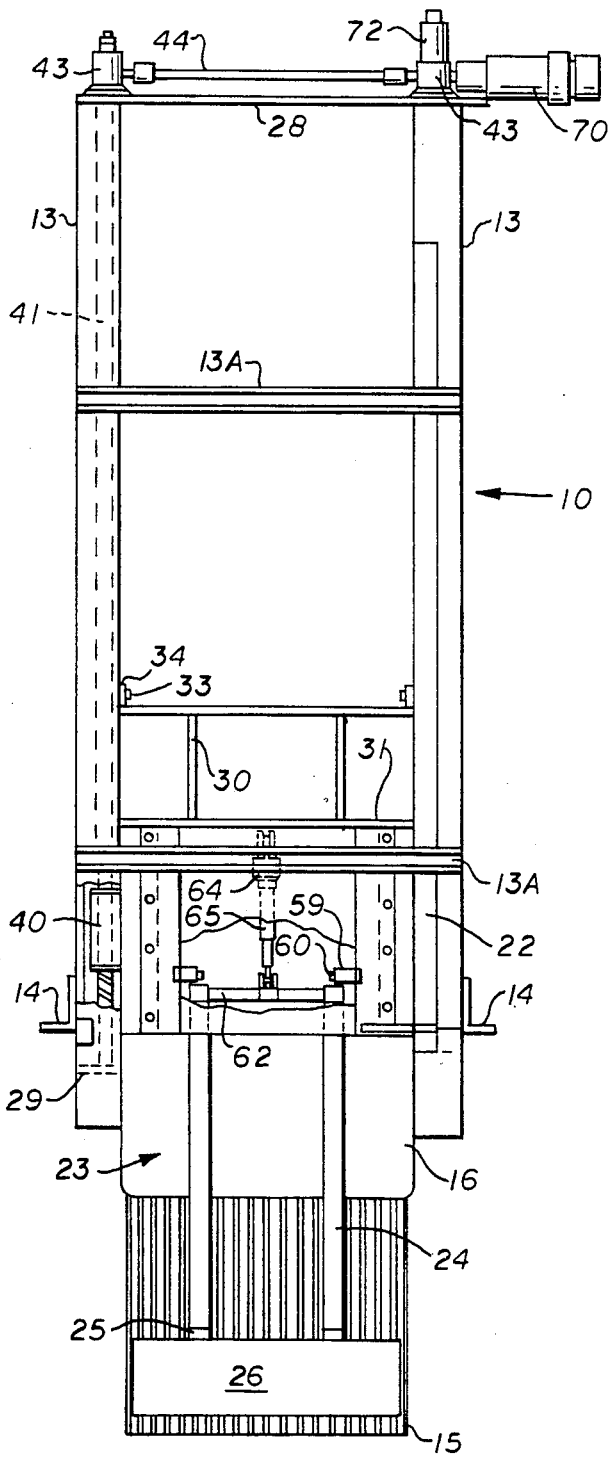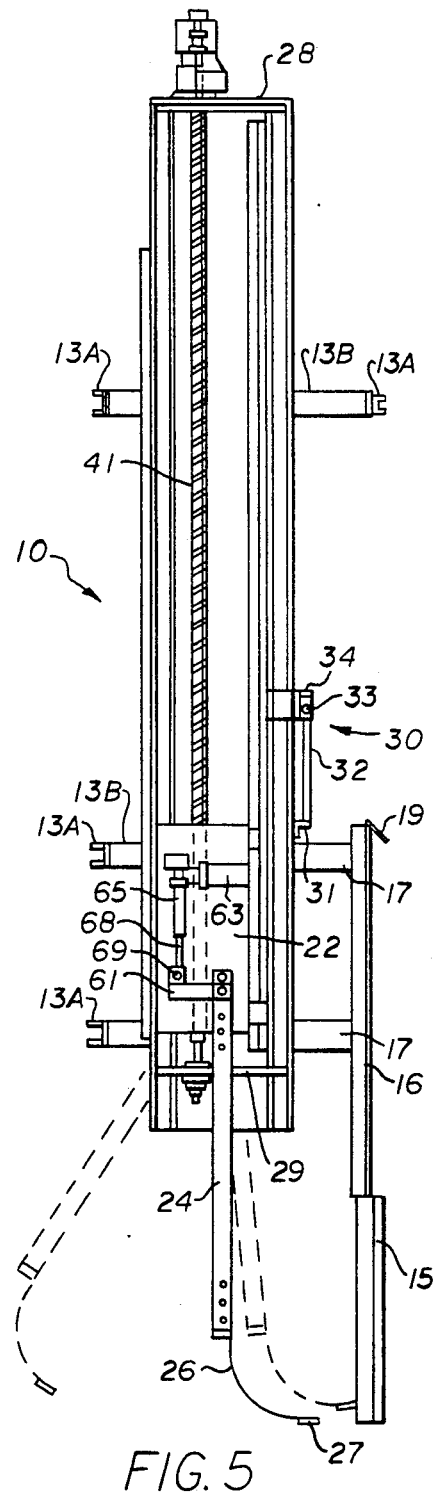

MECHANICALLY CLEANED BAR SCREEN

FIELD OF THE INVENTION

This invention relates to new and useful improvements in mechanically cleaned bar screens for removing debris from wastewater treatment facilities.

BRIEF DESCRIPTION OF THE PRIOR ART

There are several patents which disclose various types of mechanical cleaners for strainers or screens.

Schlapak U.S. Pat. No. 2,033,653 discloses an apparatus for cleaning a flume grating having a pair of reversible worm shafts, a pair of traveling nuts mounted on the shafts and supporting a rake therebetween and means to cause the rake to collect debris from the grating and eject it at the top of the up stroke.

Ostnas U.S. Pat. No. 3,482,698 discloses a cleaning system for cleaning gratings, wastewater grates, etc. which includes a power-driven vertically reciprocable rake movable along the grating. The rake is carried by a lower arm pivoted to an upper arm movable along a guide by a carriage The guide has a horizontally extending leg such that toward the upper end of the stroke, the upper arm is swung rapidly upwardly to raise the rake.

Daferner U.S. Pat. No. 3,591,006 discloses a cleaning apparatus for screens in water flumes. A rake is carried between two gear wheels which ride along fixed gear racks for movement thereby.

Albrecht U.S. Pat. No. 4,725,365 discloses another bar screen raking apparatus having rack and pinion gear drive for the rake and a pivotal connection allowing the rake to pivot away from the bar screen to go around a large obstacle on the screen.

Minichello U.S. Pat. No. 4,851,114 discloses a cleaning apparatus for bar screens having a curved track, i.e. gear rack, along which a pinion gear moves to transport the rake for cleaning the bar screen.

The present invention is distinguished over the prior art in general, and these patents in particular by providing a mechanically cleaned bar screen or bar rack for removing debris from wastewater treatment facilities which comprises a frame with housings supported thereon and a bar rack and dead plate. The apparatus is supported on the ledge of the sluice of a water or wastewater treatment facility tilted backward at an angle of about 0°–30° with the bar rack submerged in the flowing stream of water. A carriage carries a pivotally mounted rake assembly with a rake engaging the bar rack. The carriage is reciprocated along a guide rail by motor operated lead screws which extend through rollnut assemblies supporting the carriage At the top of the traverse of the carriage, the rake is swept by a wiper to remove debris to discharge down a chute for pick up. The motorized drive system is totally enclosed. The motor and gear boxes are stationary and do not travel with the rake carriage Corrosion resistant materials are used to ensure long life. The rake carriage is water tight and can be temporarily submerged without damage to the mechanism. The lead screws and linear guide system are enclosed. A motor operated linear drive system provides positive control to movement of the rake assembly. A programmable controller (PLC) constantly controls the electromechanical actuator and lead screw drive unit to periodically operate lead screws to move the carriage up and down at selected intervals and operate the linear actuator to control angular movement of the rake assembly.

SUMMARY OF THE INVENTION

It is therefore an object of the present invention to provide a new and improved mechanically operated rake for removing debris from bar screens in wastewater treatment facilities.

It is another object of this invention is to provide a new and improved mechanically operated rake for removing debris from bar screens in wastewater treatment facilities.

Another object of this invention is to provide a new and improved mechanically operated rake for removing debris from bar screens in wastewater treatment facilities which has no under water moving parts.

Another object of this invention is to provide a new and improved mechanically operated rake for removing debris from bar screens in wastewater treatment facilities with a gear box and motor which are always above the operating floor.

Still another object of this invention is to provide a new and improved mechanically operated rake for removing debris from bar screens in wastewater treatment facilities in which all mechanical drive components are enclosed.

Still another object of this invention is to provide a new and improved mechanically operated rake for removing debris from bar screens in wastewater treatment facilities in which the motor and gear boxes are stationary and do not move with the rake carriage.

A further object of this invention is to provide an improved mechanically operated rake for removing debris from bar screens in wastewater treatment facilities which is made of corrosion resistant materials.

A further object of this invention is to provide an improved mechanically operated rake for removing debris from bar screens in wastewater treatment facilities having an improved wiper for the bar rake.

A further object of this invention is to provide an improved mechanically operated rake for removing debris from bar screens in wastewater treatment facilities having a traversing rake carriage which is driven by lead screw drive having a novel drive pin construction.

A further object of this invention is to provide an improved mechanically operated rake for removing debris from bar screens in wastewater treatment facilities having a rake carriage which is water tight and can be completely submerged without damage.

A further object of this invention is to provide an improved mechanically operated rake for removing debris from bar screens in wastewater treatment facilities having rake teeth in the form of replaceable segments.

Other objects of the invention will become apparent from time to time throughout the specification and claims as hereinafter related.

The above noted objects and other objects of the invention are accomplished by a novel mechanically cleaned bar screen or bar rack for removing debris from wastewater treatment facilities which comprises a frame with housings supported thereon and a bar rack and dead plate. The apparatus is supported on the ledge of the sluice of a water or wastewater treatment facility tilted backward at an angle of about 0°–30° with the bar rack submerged in the flowing stream of water. A carriage carries a pivotally mounted rake assembly with a rake engaging the bar rack. The carriage is reciprocated along a guide rail by motor operated lead screws which extend through rollnut assemblies supported on the carriage. At the top of the traverse of the carriage, the rake is swept by a wiper to remove debris to discharge down a chute for pick up. The motorized drive system is totally enclosed The motor and gear boxes are stationary and do not travel with the rake carriage. Corrosion resistant materials are used to ensure long life. The rake carriage is water tight and can be temporarily submerged without damage to the mechanism. The lead screws and linear guide system are enclosed. A motor operated linear drive system provides positive control to movement of the rake assembly. A programmable controller (PLC) constantly controls the electromechanical actuator and lead screw drive unit to periodically operate lead screws to move the carriage up and down at selected intervals and operate the linear actuator to control angular movement of the rake assembly.

BRIEF DESCRIPTION OF THE DRAWINGS

FIG. 4 is a view in front elevation of the bar screen cleaner of FIG. 1 with portions broken away to show operating details and with the rake in a lowered position FIG. 5 is a view in side elevation of the bar screen cleaner of FIG. 1 with portions broken away to show operating details and with the rake in a lowered position.

DESCRIPTION OF THE PREFERRED EMBODIMENT

Figure 1:
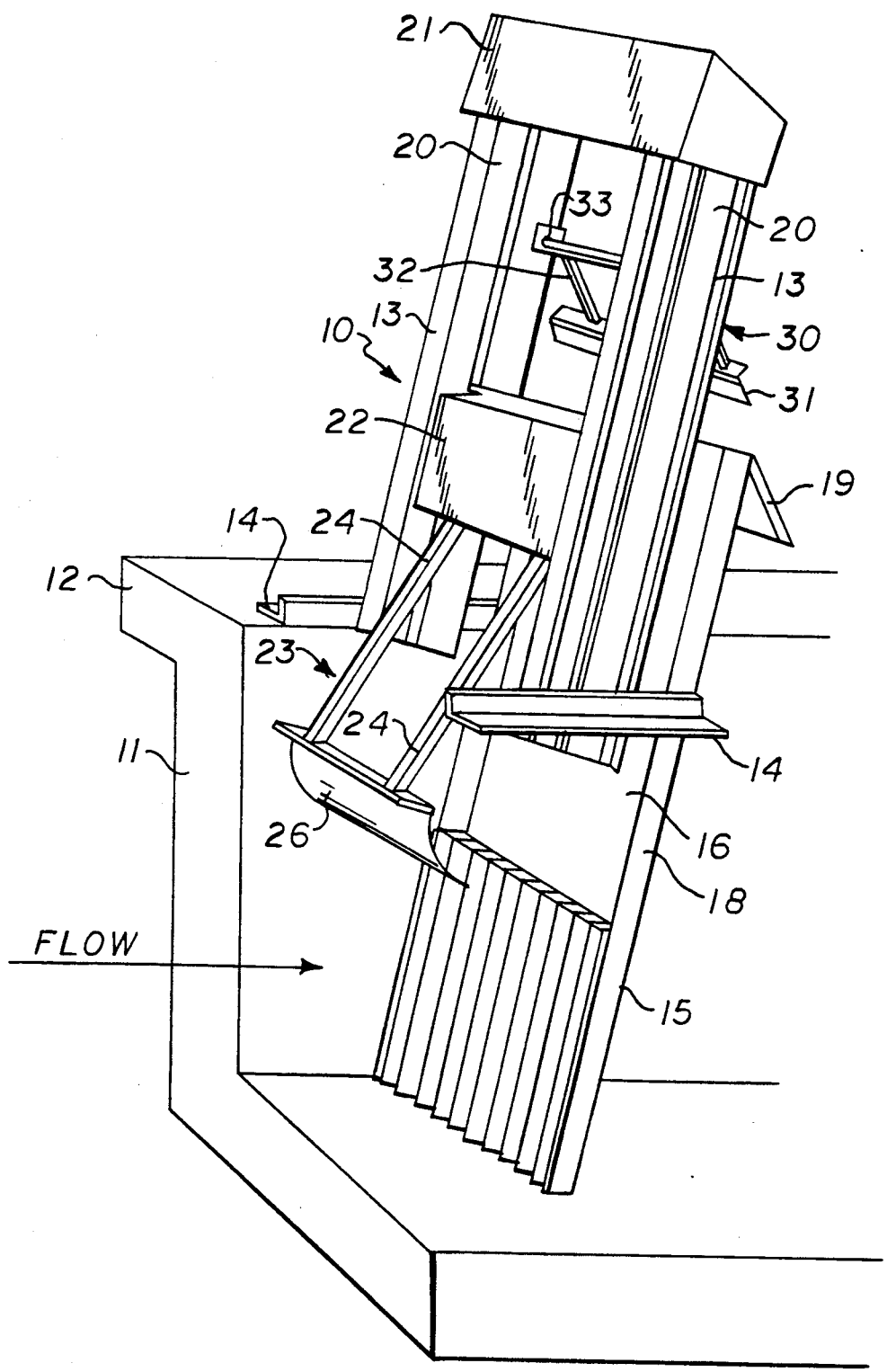
FIG. 1 is an isometric view of a mechanical bar screen cleaner for bar screens for removing debris from wastewater treatment facilities in accordance with this invention.
Figure 2:
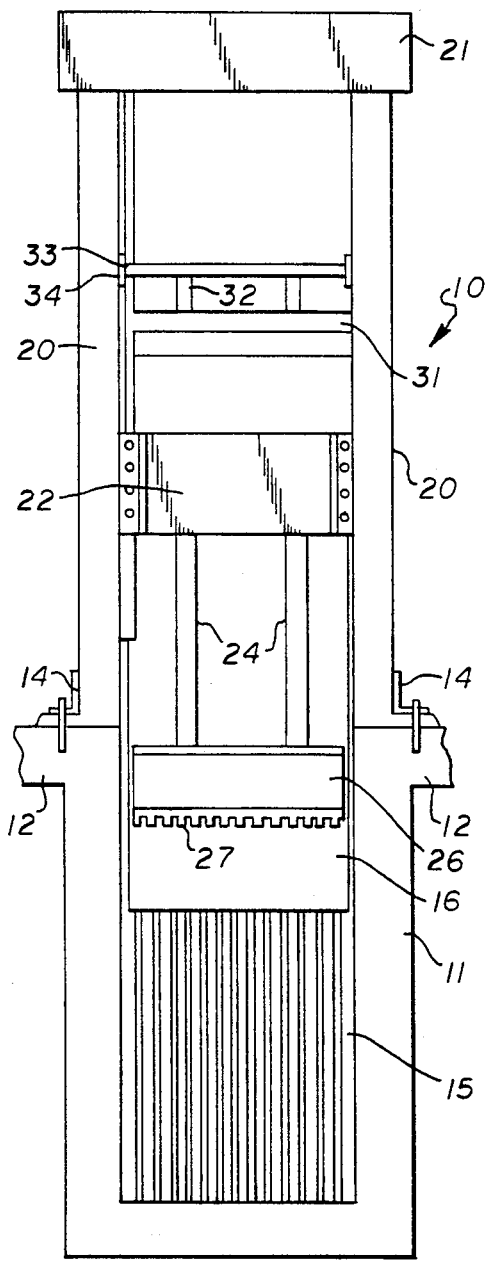
FIG. 2 is a view in front elevation of the bar screen cleaner of FIG. 1 with the rake in a partially raised position.
Figure 3:
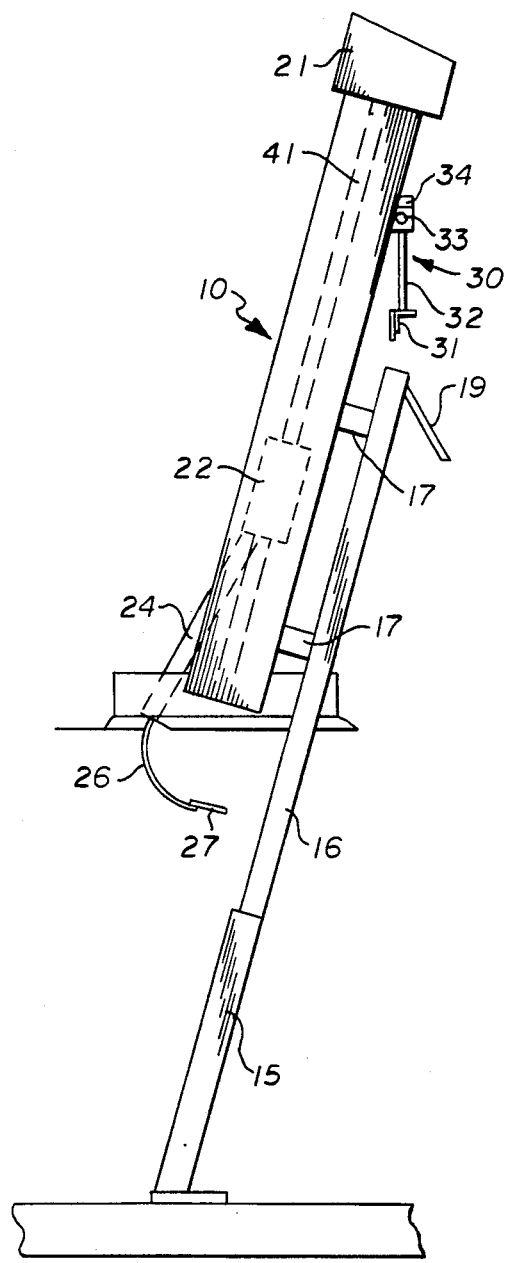
FIG. 3 is a view in side elevation of the bar screen cleaner of FIG. 1 with the rake in a partially raised position.
Figure 7:
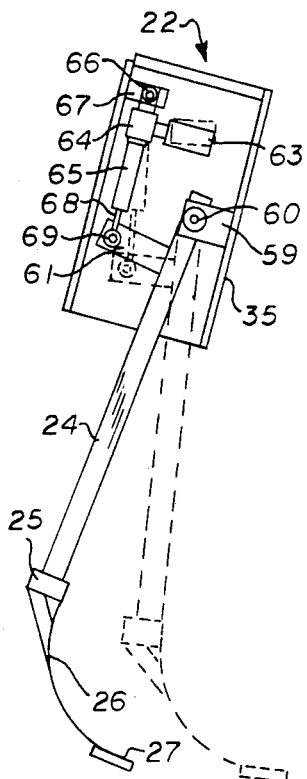
FIG. 7 is a detail view of the operating mechanism for the rake showing the movement of the rake to avoid an obstacle.
Figure 6:
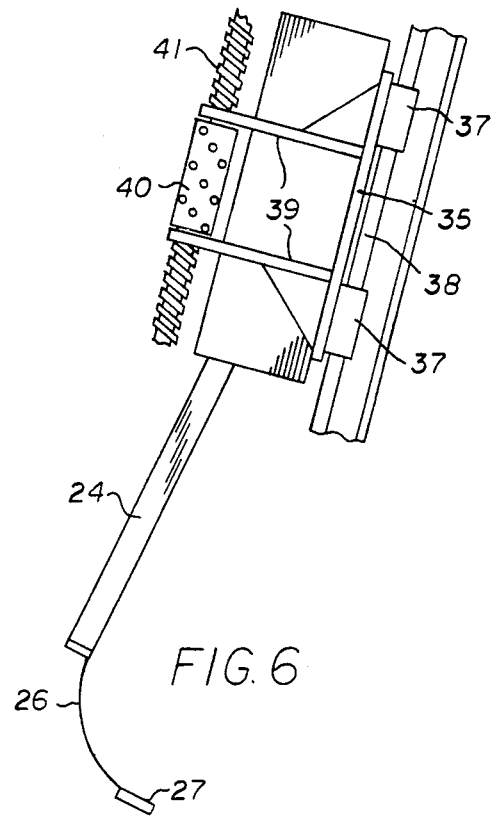
FIG. 6 is a detail view of the operating mechanism for the rake carriage.
Figure 8:
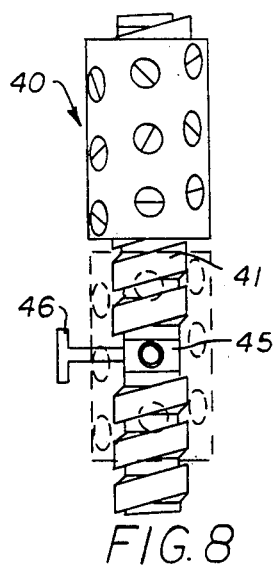
FIG. 8 is a detail view of the operating lead screw for moving the rake assembly.
Figure 10:
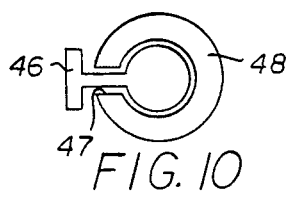
FIG. 10 is a detail view showing the support for the operating lead screw and the roller assembly moving past the support.
Figure 9:
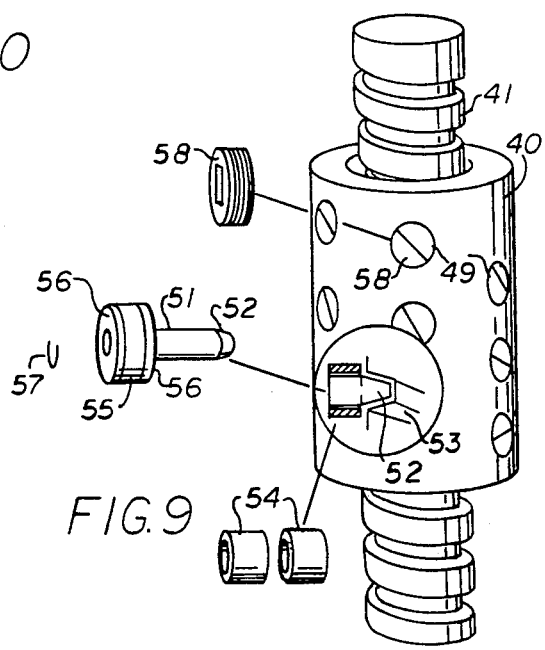
FIG. 9 is a detail exploded view of the roller assembly which carries the rake assembly along the operating lead screw.

Mechanically cleaned bar screens are installed at the headworks of water and wastewater treatment facilities to remove debris that might interfere with the process equipment down stream. The mechanical bar screen of this invention uses a stationary bar rack which captures debris in the influent stream and is then cleaned by a mechanical rake assembly. The bar screen is the first unit of process at most water or wastewater treatment facilities, whose operation is critical to the continuity of the overall plant performance.

Referring to the drawings by numerals of reference, there is shown a mechanically cleaned bar screen assembly 10 for removing debris from wastewater treatment facilities. Assembly 10 is shown in position in a sluice 11 supported on the upper ledge 12 thereof and extending to the bottom of the sluice. Assembly 10 comprises a frame 13 with angle irons 14 secured thereon to support the assembly on the upper ledges 12 of sluice 11 at a backward tilt of 0°-30° from the vertical. The particular degree of tilt is to the user's specifications.

Assembly 10 has a bar screen or bar rack 15 and dead plate 16 supported on its lower end. Bar rack 15 comprises an assembly of parallel spaced bars of conventional design with the spacing such that debris is removed from water flowing therethrough. Bar rack 15 is secured, as by bolting, to dead plate 16 which has its surface in the plane of the front of the bar rack. Dead plate 16 is secured by supports or standoffs 17 and comprises a flat channel shaped tray with side walls 18 and a rear chute 19 at the upper end thereof. As seen in FIG. 1, the bottom end of bar rack 15 abuts the bottom of sluice 11 and the normal level of water in the sluice does not come above the upper end of the bar rack. Bar rack 15 and dead plate 16 are preferably of stainless steel for protection against corrosion and wear. Bar rack 15 has openings ranging from about ½" to 3" and is available in channel widths up to 10 feet.

Frame 13 includes cross braces 13a on supports or standoffs 13b and supports an elongated corrosion-proof fiberglass housing 20 on each side and a housing 21 at the end which encloses the operating components for the mechanically powered rake. The motorized drive system in housing 21 is totally enclosed. The motor and gear boxes, described below, are stationary and do not traverse with the rake carriage. Frame 13 is closed at the top end by drive support plate 28 and at the bottom end by frame cap plate 29. A carriage 22 is supported for vertically reciprocal movement on frame 13 which carries operating components as described below.

A rake assembly 23 is supported on carriage 22 and comprises a pair of fiber glass rake arms 24 with rake mounts 25 at their lower ends on which there is supported a rake member 26 comprising a curved stainless steel plate with replaceable stainless steel teeth segments 27, the teeth of which fit the spaces between the bars in bar rack 15 to clean it on vertical movement. A wiper assembly 30 is supported pivotally on frame 13 adjacent to chute 19 on deadplate 16. Wiper assembly comprises a wiper member 31 of 90° dihedral cross section supported on arms 32 pivotally connected at 33 to wiper supports 34. Wiper assembly is gravity operated and needs no springs for soft return.

Carriage 22 comprises a carriage mount plate 35 and housing 36 which is closed at the top and open at the bottom to enclose operating components. Housing 36 is tightly sealed at the sides and top to be water tight and can be temporarily submerged without damage to the enclosed mechanism Mount plate 35 has four guide bearings 37 on opposite sides thereof which slide on precision machined, polished steel, slide guide rods 38 extending longitudinally along the back side of housings 20. A pair of brackets 39 are supported on mount plate 35 and support rollnut assembly 40 in a fixed position. The heart of the linear drive system is the rollnut device 40 which traverses along a specially machined, heat treated (56-62 Rockwell) rotating lead screw 41. The lead screws are machined with a special flank (not an acme or ballscrew thread) and may have preselected leads permitting rake speeds from 2 to 100 feet per minute. The screws are reversible from end to end to double their life cycle. Lead screw 41 extends through each of the rollnut assemblies 40 and is operable on rotation to move rollnut assembly 40 and carriage 22 longitudinally of frame 13. The lower ends of lead screws 41 are supported in bearings 42 in frame cap 29. The upper ends of lead screws 41 are operatively supported in reducer gears 43 interconnected by drive shaft 44. The lead screws and guide rods are totally enclosed for protection against water and debris.

An intermediate portion of lead screws 41 is unthreaded and supported in bearings 45 supported on hanger bracket 46 on frame 13. Alternatively, two or more lead screws may be used and the unthreaded end portions supported together in hanger bracket 46. Rollnut assembly 40 is split longitudinally to provide slotted passage 47 which may pass over hanger bracket 46. Rollnut assembly 40 comprises a machined housing 48 containing upper and lower stabilizers, multiple roller assemblies and has slot 47 through the wall thereof. Housing 48 has a plurality of openings 49 spaced circumferentially and longitudinally along helical lines corresponding to the helix of lead screws 41.

Each of the openings 49 contains a replaceable roller assembly 50 comprising a roller 51 having a tapered end 52 fitting the helical screw 53 of lead screw 41. The line contact achieved between the thread flank and the matching nose angle of the roller helps dissipate shock or overload into the thrust bearing. Roller 51 is supported in a pair of needle bearings 54 and carries thrust bearings 55 and thrust washers 56 at its outer end secured by snap rings 57. A roller assembly 50 is positioned in each of the openings 49 and secured in place by threaded plug 58. Rollnut assembly 50 is secured in a fixed position by brackets 39 with the ends of the several rollers 51 positioned in helically spaced relation along helical thread 53 of lead screw 41. The positioning and spacing of rollers 51 permits rollnut assembly 40 to pass hanger bracket 46 while maintaining a driving relation with lead screw 41. The individual roller assemblies can be replaced without disassembling the drive mechanism. Roller assemblies can be changed in less than 5 minutes each without special tools. The individual roller assemblies eliminate ball bearing seizure associated with ballscrew mechanisms.

Carriage mount plate 35 has brackets 59 which provide the supporting axle 60 for rake arms 24 supporting rake 26. Each of the rake arms 24 has a laterally extending arm 61 interconnected by rod 62 for joint operation. A motor 63 and gear housings 64 and 65 are pivoted as at 66 on bracket 67. A threaded actuator rod 68 extends from gear housing 65 through threaded connector 69 on laterally extending arm 61. Motor 63 is reversibly operated to turn rod 68 in opposite directions to move arm 61 and rake arms 24 back and forth in a predetermined manner.

At the top of the frame 13, inside housing 21, a motor and brake assembly 70 is supported on drive support plate 28. Motor 70 drives lead screws 41 through reducers 43 and drive shaft 44. An encoder 72 is supported on the housing of reducer 43 and controls the operation of motors 70 and 63. The encoder 72 delivers a signal which orients the location of the carriage 22 in relationship to the frame 13 to the PLC inside the control panel. A programmable controller (PLC) constantly monitors the electromechanical actuator and lead screw drive unit. The PLC operates motor 70 periodically to operate lead screws 41 to move carriage 22 up and down at selected intervals to move rake 26 to clean bar rack 15 to remove debris therefrom and lift it to the top of dead plate 16 where wiper 31 removes it from rake 26 and discharges it over chute 19 to a storage container (not shown). Carriage mount plate 35 extends into frame housings 20 on each side and is movable up and down along longitudinal slots 20a which are sealed by abutting sealing strips 20b which seal the length of slots 20a against moisture and debris.

The PLC also controls motor 63 to keep rake 26 engaged with bar rack 15 and dead plate 16 until it engages wiper 31, after which motor 63 is operated to move rake 26 away from dead plate 16 until it reaches the bottom of its stroke where it is brought back into engagement with bar rack 15. The PLC is also responsive to increase in current used by motor 70, as when rake 26 engages an obstacle on bar rack 15, in which case it operates motor 63 to lift rake 26 away from the obstacle and back into engagement with bar rack 15 after the obstacle is passed.

OPERATION

While the operation of this invention should be obvious from the foregoing description, it will be restated for clarity.

Mechanically cleaned bar screen assembly 10 for removing debris from wastewater treatment facilities is positioned in a sluice 11 supported on the upper ledge 12 and extending to the bottom of the sluice and having a backward tilt of 0°-30° from the vertical. The particular degree of tilt is to the user's specifications.

Bar rack 15 comprises an assembly of parallel spaced bars of conventional design with the spacing such that debris is removed from water flowing therethrough from left to right in FIG. 1. As seen in FIG. 1, the bottom end of bar rack 15 abuts the bottom of sluice 11 and the normal level of water in the sluice does not come above the upper end of the bar rack. The flow of water through bar rack 15 causes debris of larger size than the bar spacings to collect thereon.

In the initial position, the rake is at its uppermost point. Upon activation, the PLC engages motor drive 70. The rake 26 moves downward until the rake 26 is at the lower end of bar rack 15 with teeth 27 fitting into the spaces between the bars. Motor 70 is activated to rotate lead screws to move carriage 22 upward. This upward movement rakes debris from bar rack 15 along dead plate 16 until it reaches discharge chute 19 where the debris is discharged for pick up.

During the traversing movement of carriage 22 by motor 70, rake 26 is held with teeth 27 positively engaged with bar rack 15 (and subsequently with dead plate 16) by the actuator consisting of motor 63, gears 64 and 65, and acme threaded rod 68. As previously described, whenever rake 26 encounters an obstacle (debris stuck in the bar rack), the apparatus does not jam but rake is profiled around the obstacle by response of the PLC to current changes in motor 70 which operates motor 63 to move rake arms just enough to allow rake teeth to slide over the obstacle.

While this invention has been shown fully and completely with special emphasis on certain preferred embodiments, it should be understood that within the scope of the appended claims the invention may be practiced otherwise than as specifically described herein.

We claim:

1. A mechanical rake assembly for bar racks for screening debris from flowing liquid comprising a bar rack for positioning in a liquid channel to remove debris and a deadplate substantially coplanar therewith, a frame supporting said deadplate in laterally spaced relation thereto, said bar rack, deadplate and frame comprising a longitudinally extending assembly for positioning in said channel in a substantially vertical direction with a backward tilt in relation to the direction of flow in said channel, a carriage longitudinally movable on said frame, a rake assembly comprising a rake positioned to engage said bar rack and supporting arms pivotally supported on said carriage, motor means fixedly supported at the top of said frame, means operatively connecting said motor means to said carriage to move said carriage reciprocally on said frame, motor actuator means supported on said carriage and operatively connected to said rake supporting arms for pivotal movement of said rake, said motor actuator means comprises a motor, a threaded rod, a gear interconnecting said motor and said threaded rod for selective rotation thereof, a threaded connection between said threaded rod and said rake supporting arms, whereby operation of said motor is operable to positively move said rake into and out of engagement with said bar rack and said deadplate, and means supported at a fixed position at the top of said frame to control operation of said motor means and said motor actuator means to control movement of said carriage and said rake supporting arms.

2. A mechanical rake assembly for bar racks according to claim 1 in which said carriage includes a watertight housing with a bottom opening through which said rake supporting arms extend, said watertight housing being submersible in water temporarily without damage to said motor and said gear.

3. A mechanical rake assembly for bar racks according to claim 1 in which said operatively connecting means comprises a plurality of rollnuts secured to said carriage, at least one rotatable lead screw passing through said rollnuts in operating relation therewith, said lead screw being secured on said frame and operatively connected to said motor means for rotation thereby to traverse said carriage up and down said frame.

4. A mechanical rake assembly for bar racks according to claim 1 in which said operatively connecting means comprises a plurality of rollnuts secured on opposite sides of said carriage, a pair of rotatable lead screws on opposite sides of said frame and extending longitudinally thereof, said lead screws passing through said rollnuts on opposite sides of said carriage in operating relation therewith, said lead screws being secured on said frame and each operatively connected to said motor means for rotation thereby to traverse said carriage up and down said frame, and said control means controlling operation of said motor means to control rotation of said lead screws and thus control movement of said carriage.

5. A mechanical rake assembly for bar racks according to claim 4 in which said rollnuts comprise a machine housing containing upper and lower stabilizers, multiple roller assemblies and have a slot through the wall thereof, said machined housing having a plurality of openings spaced circumferentially and longitudinally along helical lines corresponding to said lead screws, each of said openings containing a replaceable roller assembly comprising a roller having a tapered end fitting said lead screw, the line contact between said lead screw and said rollers dissipating chock or overload into the thrust bearing, said roller being supported in a pair of needle bearings and carries thrust bearings and thrust washers at its outer end secured by snap rings, a roller assembly being positioned in each of said openings and secured in a place by a threaded or mechanically fastened plug.

6. A mechanical rake assembly for bar racks according to claim 5 in which said rollnut assembly is secured in a fixed position by brackets with the ends of the several rollers positioned in helically spaced relation along said lead screw.

7. A mechanical rake assembly for bar according to claim 5 including a plurality of lead screws supported in end to end relation on said frame for operation by said motor means and a supporting bracket on said frame supporting the unthreaded end portion of said lead screws, and said rollnut housing slot being position to pass over said supporting bracket while maintaining an operating relationship with said lead screw to permit movement of said carriage through substantially the entire length of said lead screw.

8. A mechanical rake assembly for bar racks according to claim 1 in which said frame has enclosed housings on each side thereof and a housing at the top end enclosing said motor means and said control means, and said side housings each having a longitudinal slot receiving one side of said carriage for longitudinal movement therein.

9. A mechanical rake assembly for bar racks according to claim 8 including rubber strips sealing said longitudinal slots ahead of and behind said carriage as said carriage is moved therein.

10. A mechanical rake assembly for bar racks according to claim 9 in which said housing are each of corrosion proof fiberglass construction.

11. A mechanical rake assembly for bar racks according to claim 1 including guide rods supporting said carriage on one side for longitudinal sliding movement thereon, a plurality of rollnuts secured on opposite sides of said carriage on a side opposite from said guide rods, a pair of rotatable lead screws on opposite sides of said frame and extending longitudinally thereof, said lead screws passing through said rollnuts on opposite sides of said carriage in operating relation therewith, said lead screws being secured on said frame and each operatively connected to said motor means for rotation thereby to traverse said carriage up and down said frame.

12. A mechanical rake assembly for bar racks according to claim 1 in which said carriage comprises a carriage mount plate with said carriage housing secured thereon, a pair of guide rods secured on and extending for the length of said frame, guide slide bearings secured on said mount plate and positioned on said guide rods for sliding movement thereon, a pair of brackets secured to said mount plate and supporting a plurality of rollnuts secured on opposite sides of said carriage on a side opposite from said guide rods, a pair of rotatable lead screws on opposite sides of said frame and extending longitudinally thereof, said lead screws passing through said rollnuts on opposite sides of said carriage in operating relation therewith, said lead screws being secured on said frame and each operatively connected to said motor means for rotation thereby to traverse said carriage up and down said frame, and said control means controlling operation of said motor means to control rotation of said lead screws and thus control movement of said carriage.

13. A mechanical rake assembly for bar racks according to claim 12 including a plurality of lead screws supported in end to end relation on said frame for operation by said motor means and a supporting bracket on said frame supporting the unthreaded end portion of said lead screws, and said rollnuts having a housing with a slot position to pass over said supporting bracket while maintaining an operating relationship with said lead screw to permit movement of said carriage through substantially the entire length of said lead screw.

14. A mechanical rake assembly for bar racks according to claim 1 in which said means supported at a fixed position at the top of said frame to control operation of said motor means and said motor actuator means to control movement of said carriage and said rake supporting arms is an encoder signaling a programmable controller (PLC) that constantly monitors said motor means and said motor actuator means and operates said motor means to move said rake to clean said bar rack to remove debris therefrom and lift it to the top of said dead plate to discharge it to storage.

15. A mechanical rake assembly for bar racks according to claim 1 in which said rake comprises a curved imperforate plate supported on one side by said rake supporting arms and having replaceable teeth segments supported along the other side, said curved plate and teeth segments being formed of stainless steel.

16. A mechanical rake assembly for bar racks for screening debris from flowing liquid comprising a bar rack for positioning in a liquid channel to remove debris and a deadplate substantially coplanar therewith, a frame supporting said deadplate in laterally spaced relation thereto, said bar rack, deadplate and frame comprising a longitudinally extending assembly for positioning in said channel in a substantially vertical direction with a backward tilt in relation to the direction of flow in said channel, a carriage longitudinally movable on said frame, a rake assembly comprising a rake positioned to engage said bar rack and supporting arms pivotally supported on said carriage, motor means fixedly supported at the top of said frame, means operatively connecting said motor means to said carriage to move said carriage reciprocally on said frame, motor actuator means supported on said carriage and operatively connected to said rake supporting arms for pivotal movement of said rake, means supported at a fixed position at the top of said frame to control operation of said motor means and said motor actuator means to control movement of said carriage and said rake supporting arms, and said carriage including a watertight housing with a bottom opening through which said rake supporting arms extend, said watertight housing being submersible in water temporarily without damage to said motor actuator means.

17. A mechanical rake assembly for bar racks for screening debris from flowing liquid comprising a bar rack for positioning in a liquid channel to remove debris and a deadplate substantially coplanar therewith, a frame supporting said deadplate in laterally spaced relation thereto, said bar rack, deadplate and frame comprising a longitudinally extending assembly for positioning in said channel in a substantially vertical direction with a backward tilt in relation to the direction of flow in said channel, a carriage longitudinally movable on said frame, a rake assembly comprising a rake positioned to engage said bar rack and supporting arms pivotally supported on said carriage, motor means fixedly supported at the top of said frame, means operatively connecting said motor means to said carriage to move said carriage reciprocally on said frame, motor actuator means supported on said carriage and operatively connected to said rake supporting arms for pivotal movement of said rake, means supported at a fixed position at the top of said frame to control operation of said motor means and said motor actuator means to control movement of said carriage and said rake supporting arms, and said dead plate has a rebent portion forming an acute dihedral angle at its upper end defining a discharge chute to the rear of the apparatus for debris raked to that position by said rake.

18. A mechanical rake assembly for bar racks according to claim 17 in which a gravity operated pivoted wiper is supported on said frame adjacent to said chute to engage said rake and wipe the contents therefrom.

19. A mechanical rake assembly for bar racks according to claim 17 in which a gravity operated pivoted wiper comprising a 90° dihedral angle cross section member with support arms pivotally supported on said frame adjacent to said chute to engage said rake and wipe the contents therefrom.

* * * * *